3,117,101
WAX COATING COMPOSITIONS
Hallard C. Moyer, Homewood, Ill., assignor, by mesne assignments, to Sinclair Research, Inc., New York, N.Y., a corporation of Delaware
No Drawing. Filed July 28, 1958, Ser. No. 751,178
10 Claims. (Cl. 260—28.5)

The present invention relates to an improved wax composition for coating or laminating materials, for instance paper or other fibrous or sheet materials. More particularly the present invention is intended to provide coating and laminating wax compositions of increased sealing or laminating strength at both high and low temperatures without adversely affecting other desired properties in such wax compositions.

Wax compositions have found increasingly extensive use in recent years for coating paper and paperboard materials to be used as protective and decorative wrappings for a wide variety of substances. In addition, wax compositions have been used as adhesives for laminating two or more plies of paper or other sheet material. Such coatings and laminants have found particularly extensive use in the food industry, where a wide variety of products are packaged. A few examples of such uses are bread wrappers, frozen food overwrappers, cracker and cereal box wrappers and liners, household waxed paper, drinking cups, milk cartons, laminated paper and glassine bags and pouches, and paperboard cartons laminated to liners or overwrappers.

In most of these applications it is highly desirable that the wax composition possess adhesive and cohesive strength as manifested by high heat seal strength, high laminating strength, or strong adherence to the substrate to minimize peeling, chipping and flaking. However, where wax coated paper is used as an outer wrapping, it is usually of major importance that such a coating also have high gloss, hardness, scuff resistance and blocking resistance so that the package will maintain attractiveness and sales appeal. In order to obtain these properties to the desired degree, and particularly with a wax composition having molten viscosity such that it can be coated readily with conventional waxing equipment, it is normally necessary to use a wax composition which affords less than the desired heat-sealability. Typical of wax compositions affording less than the desired heat-sealability are those into which have been incorporated small amounts of conventional polyethylene polymers of various molecular weights.

Similarly, if a wax compound having the desired sealing strength is employed, it is necessary to sacrifice gloss, hardness, blocking and scuff resistance, or resort to use of a composition containing an unduly high content of a polymer such as polyethylene, or containing a rubbery, viscous, difficulty soluble, high molecular weight polymer such as polyisobutylene or butyl rubber. In the latter cases, cost of the coating is increased, and the high viscosity of such blends renders the composition difficult, if not impossible, to handle in coating operations employing conventional waxing equipment. Where the package is to be stored or handled at low temperatures, as in the case of frozen foods, the problem is even more difficult, as most compositions affording good seal strength at low temperature are relatively soft and tacky at room temperature—a condition which creates gloss, blocking, and handling problems. The compositions of this invention alleviate these problems by (a) affording high sealing strength over an unusually wide temperature range, (b) affording excellent gloss, blocking resistance, hardness, and scuff resistance, and (c) ease of preparation and application to paper.

Wax laminants usually contain predominantly microcrystalline wax of petroleum origin, often in combination with a tacky polymeric or resinous material. Wax laminants can be softer and tackier than coating waxes, of course, since gloss, blocking resistance, etc., are unnecessary. However, use of a relatively soft composition does not insure good laminating strength. Many commercially available microcrystalline waxes lack the inherent adhesivity required in a good laminating wax, especially if good lamination strength must be maintained at low temperatures. Incorporation of tacky, high molecular weight polymers, such as butyl rubber or polyisobutylene, may improve lamination strength, but such rubbery polymers do not blend readily with wax and must be incorporated by means of special mixers or mills. Also, when used in sufficient quantity to improve low temperature laminating strength, these rubbery additives cause a great increase in blend viscosity which renders such compositions difficult to apply at the desired high speeds.

Ordinarily, to obtain good laminating strength at low temperature it is necessary to use a wax composition made softer by the inclusion of oil or low melting wax. However, such a composition has a greater tendency to bleed and stain the plies when exposed to normal or slightly elevated temperatures. Thus, staining is a difficulty frequently encountered as a result of soft, low melting components used to impart greater sealing or laminating strength to a wax composition. The compositions of this invention alleviate these problems by (a) affording high laminating strength without undue softness, (b) eliminating need for rubbery, viscous, difficultly soluble polymers, (c) permitting low viscosity and easy application, and (d) permitting utilization of waxes which normally would not be sufficiently adhesive for use as laminants.

It has been found that compositions affording the advantages described above can be readily prepared by incorporating a minor amount of oxidized polymethylenic resin into an essentially non-aqueous petroleum wax composition consisting essentially of about 0 to 90% by weight of a paraffin wax and about 10 to 100% by weight of a microcrystalline wax and having about 0 to 35% by weight of a polyethylene resin. The relative amounts of each type of wax which will be used depends on the properties of the specific waxes in question, and on the intended use of the wax coating or lamination. For example, when glossy, scuff-resistant coatings are desired, paraffin waxes and relatively hard microcrystalline waxes or combinations of the two are usually used. A preferred coating wax composition will generally contain, as the petroleum wax component, about 30 to 60 weight percent of relatively hard microcrystalline wax and about 40 to 70 weight percent of paraffin wax. On the other hand, for laminations or special adhesive coatings, a relatively soft microcrystalline wax is usually, though not necessarily, the principal component. Preferred laminating wax compositions, generally, contain a wax component having about 80 to 100 weight percent of relatively soft microcrystalline wax and about 0 to 20 weight percent of paraffin wax. Likewise, whether or not and in what amounts, regular or unoxidized polyethylene, as distinguished from the oxidized resin essential to my present compositions, will be used in this invention depends on the properties and proportions of the waxes employed and the intended use and desired physical properties of the wax coating or laminating composition.

The paraffin wax suitable for use in the instant invention can be a fully or semi-refined petroleum wax. In general the wax can be obtained from paraffin base crude oils such as Pennsylvania crude or mixed base crudes and will usually have a melting point of about 120 to 165° F.

The petroleum microcrystalline wax component of the present composition can be prepared, for example, by conventional solvent deoiling of petrolatum from a Mid-Continent crude oil or a Pennsylvania crude oil and generally has a melting point of about 100 to 180° F. As mentioned both the hard and relatively soft microcrystalline waxes find use in the present invention. The relatively soft microcrystalline waxes useful in the present invention may be identified as those microcrystalline waxes having a 100 gram needle penetration at 77° F. of about 17 to 30 or more, and more typically of about 20 to 25. The relatively hard microcrystalline waxes, i.e. those microcrystalline waxes usually employed in the coating compositions of the present invention are identified as having a 100 gram needle penetration at 77° F. of about 10 to 17.

The regular polyethylene resins which can be used in the present invention are any of the tough, flexible, translucent, wax-compatible, i.e. dispersible, miscible or soluble in wax, polymers of the general formula $(CH_2)_n$ made by polymerizing ethylene. Such polymers are common items of commerce and generally have a molecular weight of at least about 750. They differ somewhat in degree and type of branching, crystallinity, and physical specifications, and they are produced in a wide range of average molecular weights. Use of the lower molecular weight polymers (advantageously about 2,000–25,000) as wax modifiers and additives is well known to all those concerned with the art, and it is the polymers of this molecular weight group which are preferred for purposes of this invention. The type of regular polyethylene used in these compositions can be varied. Its selection, like the function it performs, will depend somewhat on the intended application. In glossy surface coatings, its function is to enhance gloss stability, hardness, toughness, cohesive strength, scuff resistance, and blocking resistance. In non-glossy coatings, which result from slow-cooling the film as, e.g. in the case of dip-coated, air-cooled cartons, polyethylene does not act as a gloss improver, but performs the other functions mentioned above, and also acts to control the degree of penetration into the substrate, and acts as a film leveling agent. When used in wax laminations, it increases cohesive strength and reduces penetration into the substrate. By varying type, amount, and molecular weight, it can also be used to regulate melt viscosity of adhesive mixtures in order to obtain optimum performance on coating or sealing equipment. If employed the proportion of polyethylene which can be used advantageously in these compositions varies from about 0.2–35% by weight. In most cases a concentration of from about 0.5% to about 10% will be most advantageous.

By oxidized polymethylenic resin is meant any of the hydrocarbon resins predominantly of $(-CH_2-)_n$ structure which have been oxidized through reaction with oxygen sufficiently to introduce carboxylic groups. These resins have molecular weights of at least about 750, preferably at least about 2000 and are essentially of polymethylenic configuration and can be obtained from various sources, for instance by ethylene or propylene polymerization. The oxidized product is wax-compatible, i.e. dispersible, miscible or soluble in wax; however, it is preferred that the molecular weight not be greater than about 25,000. In order to realize full benefit, the degree of oxidation should be sufficient that at least one carboxylic group is introduced for each 15 average molecules, and preferably for each 1–3 average molecules. However, benefits may be obtained from lesser degrees of carboxylic content. A polyethylene resin of the above degree of oxidation substantially retains its rigidity and hardness. A preferred oxidized polyethylene resin will exhibit a needle penetration (100 g./5 sec./77° F.) of about 0.4 mm. or less. The concentration of partially oxidized polymethylenic resin which can be advantageously used in the present invention will depend on the degree of oxidation and the intended use, and generally will fall between the limits of about 0.1 to 10%, and preferably between the limits of about 0.25 to 3%. If desired, the oxidized polyethylene can be steam treated.

At least two examples of oxidized polyethylene are now commercially available. "Epolene E" is marketed by Eastman Chemical Products, Inc. It has an average molecular weight of about 2500, an acid number of about 8–12, and a saponification number of about 20–25. A-C Polyethylene 629, marketed by Semet-Solvay Petrochemical Division, has an average molecular weight of about 2000, an acid number of about 14–17, and a saponification number of about 25–30. Both "Epolene E" and A-C Polyethylene 629 contain about one carboxylic group for each 2 average molecules. In addition, polyethylenes of higher molecular weight can be partially oxidized to form products satisfactory for purposes of this invention. The only restriction on the molecular weight of polyethylene which can be satisfactorily utilized is that dictated by convenience of oxidation and blending. Polyethylenes having a molecular weight greater than about 25,000 have high melt viscosity and contribute to unduly high viscosity and inconvenience of blending in wax compositions.

It must be emphasized that certain low molecular weight polyethylenes which might be considered "partially oxidized," since they contain oxygen as a result of the presence of hydroxyl or ester groups, are not suitable as the partially oxidized polymethylenic resin component of this invention because they do not contain carboxylic (—COOH) groups. For example, Semet Solvay's G–201 Polyethylene exhibits an acid number of zero and a saponification number of about 25. Hence, Semet Solvay's A-C Polyethylene 6 (originally Alcowax 6) or Polyethylene G–201 are completely unsuited for this purpose. The hydroxyl groups claimed to be present in these molecules do not provide the type of partial oxidation necessary to provide the strong adhesion achieved by the compositions of this invention. Manufacture and use of such hydroxyl-containing polymers is described in U.S. Patents 2,504,400 and 2,712,534 to M. Erchak, Jr. This is emphasized in view of U.S. Patent 2,698,309 to Thwaites and Hitchcox, wherein a blend of conventional high pressure polyethylene, Alcowax 6, and petroleum wax is claimed to exhibit superior blocking resistance and sealing strength. The wax coating compositions of the present invention as a result of the presence of small amounts of a carboxylic acid group containing polymethylenic resin are found to exhibit properties of sealing strength, blocking resistance, and others superior to the wax composition described in the Thwaites and Hitchcox patent.

The following examples will serve to illustrate the present invention.

EXAMPLE I

A series of blends was prepared having the compositions shown in Table I. The blends were prepared by adding the materials to a vessel, heating to about 220° F. and stirring until complete solution was obtained. About one half-hour was required for the blending operation. Results of tests on these blends are summarized in Table I.

Table I

| Composition, wt. percent | | | Test Properties | | | | |
|---|---|---|---|---|---|---|---|
| Wax Blend [1] | Polyethylene, 12,000 mol. wt. | Oxidized Polyethylene,[2] 2,500 mol. wt. | Sealing Strength, gm./3 in. | | | Blocking Temp., °F. (TAPPI T652 SM-57) | Viscosity, SSU/210° F. |
| | | | 75° F. | 0° F. | −20° F. | | |
| 95 | 5 | | 52 | 38 | 31 | 115 | 125 |
| 95 | 4.75 | 0.25 | 95 | 70 | 52 | 115 | 115 |
| 95 | 4.5 | 0.50 | 180 | 112 | 101 | 118 | 109 |
| 95 | 4.0 | 1.0 | 175 | 124 | 109 | 116 | 101 |
| 95 | 3.0 | 2.0 | 162 | 102 | 95 | 115 | 85 |

[1] 50% Paraffin Wax A (136° F. M.P.) plus 50% Microcrystalline Wax A (171° F. M.P., 13 needle penetration at 77° F.).
[2] "Epolene E."

Table I illustrates the superior sealing strength of the oxidized polyethylene-containing wax compositions of this invention compared to a conventional product. Also illustrated is the retention of blocking performance and low viscosity of the novel compositions.

EXAMPLE II

Another series of blends was prepared according to the method of Example I. Compositions and results of tests on these blends are shown in Table II.

Table II

| Composition, wt. percent | | | Test Properties | | | | |
|---|---|---|---|---|---|---|---|
| Wax Blend [1] | Polyethylene, 4,000 mol. wt. | Oxidized Polyethylene,[2] 2,000 mol. wt. | Sealing Strength gm./3 in. | | Blocking Temp., °F. (TAPPI T652 SM-57) | Gloss 75° Glossmeter, Initial—7 Day | Viscosity, SSU/210° F. |
| | | | 75° F. | 0° F. | | | |
| 95 | 5 | | 77 | 35 | 116 | 94–94 | 62.7 |
| 95 | 4.5 | 0.5 | 141 | 59 | | 94–94 | |
| 95 | 4 | 1 | 150 | 61 | 118 | 94–94 | 62.1 |
| 94 | 4 | 2 | 132 | 75 | 114 | 94–94 | |

[1] 50% Paraffin Wax B (137° F. M.P.) plus 50% Microcrystalline Wax B (170° F. M.P., 13 needle penetration at 77° F.).
[2] A-C Polyethylene 629.

Table II further illustrates the superior sealing strength of the new compositions which is obtained without sacrifice in blocking resistance, gloss, or recourse to viscous additives.

EXAMPLE III

Another series of blends was prepared according to the method of Example I. Compositions and results of tests on these blends are shown in Table III.

Table III

| Composition, wt. percent | | | Test Properties | | | |
|---|---|---|---|---|---|---|
| Wax Blend [1] | Polyethylene, 12,000 mol. wt. | Oxidized Polyethylene, 2500 mol. wt. | Sealing Strength, gm./3 in., 75° F. | Blocking Temp., °F. (T652 SM-57) | Gloss 75° Glossmeter, Initial—7 Day | Viscosity, SSU/210° F. |
| 98 | 2 | | 52 | 138 | 93–93 | 63.3 |
| 97 | 2 | 1 | 212 | 138 | 93–93 | 64.0 |
| 95 | 5 | | 55 | 137 | 92–92 | 110 |
| 94 | 5 | 1 | 185 | 138 | 92–92 | 112 |

[1] 90% Paraffin Wax C (152° F. M.P.) plus 10% Microcrystalline Wax B (170° F. M.P., 13 needle penetration at 77° F.)

Table III illustrates the high sealing strength obtained in two additional compositions of this invention without sacrifice in blocking, gloss or fluidity.

EXAMPLE IV

Another series of blends was prepared according to the method of Example I, with the exception that in some blends butyl rubber was incorporated as a pre-milled concentrate in wax, and polyisobutylene was incorporated by means of a special high-shear agitator. Compositions and results of tests on these blends are shown in Table IV.

Table IV

| Components, wt. percent | A | B | C | D | E | F | G | H | J | K |
|---|---|---|---|---|---|---|---|---|---|---|
| Wax Component [1] | 100 | 97 | 97 | 97 | 97 | 97 | 97 | 90 | 99.25 | 89.5 |
| Polyethylene, 4000 mol. wt. | | 3 | | | | 2 | | 9 | 0.5 | 0.5 |
| Polyethylene, 12,000 mol. wt. | | | 3 | | | | 2 | | | |
| Butyl Rubber [2] | | | | 3 | | | | | | |
| Polyisobutylene, 80,000 mol. wt. | | | | | 3 | | | | | |
| Oxidized Polyethylene [3] | | | | | | 1 | 1 | 1 | 0.25 | 10 |
| Test Properties: | | | | | | | | | | |
| Laminating Strength, g./3 in.— | | | | | | | | | | |
| at 75° F | 180 | 115 | 125 | 175 | 140 | 315 | 350 | | 345 | 375 |
| at 0° F | 34 | 37 | 40 | 37 | 25 | 65 | 65 | 88 | 65 | 71 |
| Stain Temperature, °F | 107 | 125 | 118 | 115 | 119 | 127 | 131 | 130 | 115 | 137 |
| Viscosity, SSU/210° F | 77 | 92 | 148 | 250 | 879 | 92 | 125 | 144 | 81 | 144 |

[1] Microcrystalline Wax C, 170° F., M.P., 23 needle penetration at 77° F.
[2] Copolymer of 97% isobutylene and 3% Isoprene.
[3] "Epolene E."

The results contained in Table IV clearly illustrate that typical compositions of this invention, represented by blends F, G, H, J and K exhibit the desired properties of high laminating strength, high stain temperature and low viscosity to a degree not at all exhibited by the wax component alone or by the wax component to which has been added a corresponding amount of regular polyethylene. Blend J illustrates that even very minor amounts of the combination of oxidized and unoxidized polyethylene impart the desired properties to the wax to a remarkable degree. Blends D and E illustrate that use of relatively viscous, tacky polymeric materials do not insure the desired laminating strength, even when used at a concentration high enough to cause considerable viscosity increase in the blend.

EXAMPLE V

Another series of blends was prepared according to the method of Example I to show the effects of adding oxidized polyethylene alone to microcrystalline wax. The compositions and results of tests are shown in Table V.

Table V

| Components, wt. percent | A | Q | R | S | T |
|---|---|---|---|---|---|
| Wax Component [1] | 100 | 99.75 | 99.5 | 97 | 90 |
| Oxidized Polyethylene [2] | | 0.25 | 0.5 | 3 | 10 |
| Test Properties: | | | | | |
| Laminating Strength, g./3 in.— | | | | | |
| at 75° F | 180 | 345 | 368 | 365 | 375 |
| at 0° F | 34 | 65 | 70 | 60 | 68 |
| Stain Temperature, °F | 107 | 110 | 112 | 122 | 137 |
| Viscosity, SSU/210° F | 77 | | | 79 | 94 |

[1] Microcrystalline Wax C, 170° F., M.P., 23 needle penetration at 77° F
[2] "Epolene E."

The data demonstrate that the addition of conventional polyethylene although beneficial in certain respects, is not necessary to obtain the principal benefit of the above laminating compositions, i.e. high laminating strength over a wide temperature range, ease of prepartion, economy, and utilization of microcrystalline wax having limited laminating strength. Furthermore, the data show that staining tendency is decreased.

EXAMPLE VI

Another series of blends was prepared according to the method of Example IV. A relatively soft microcrystalline wax component was used in these blends in order to demonstrate the very high low-temperature laminating strength afforded by the compositions of this invention. Compositions and results of tests are summarized in Table VI.

Table VI

| Components, wt. percent | L | M | N |
|---|---|---|---|
| Microcrystalline Wax "D" [1] | 100 | 99 | 99 |
| Polyethylene, 4000 mol. wt | | ½ | |
| Oxidized Polyethylene [2] | | ½ | |
| Butyl Rubber | | | 1 |
| Test Properties, Laminating Strength, g./3 in. at— | | | |
| 75° F | 85 | 310 | 98 |
| 0° F | 20 | 145 | 31 |

[1] 168° F. M.P., 29 needle penetration at 77° F., derived from Mid-Continent Crude.
[2] "Epolene E."

Blend M illustrates that very strong seal strength can be readily achieved with a typical composition of this invention, even at very low temperature, and in spite of the weak sealing characteristics of Microcrystalline Wax "D," the principal component.

EXAMPLE VII

A series of blends was prepared according to the method of Example IV above. Compositions and results of tests on these blends are shown in Table VII.

Table VII

| Components, wt. percent | 1 | 2 | 3 | 4 | 5 | 6 | 7 | 8 | 9 | 10 |
|---|---|---|---|---|---|---|---|---|---|---|
| Paraffin Wax A [1] | 99 | 97 | 97 | 97 | 89 | 87 | 89 | 87 | 87 | 88 |
| Microcrystalline Wax A [2] | | | | | 10 | 10 | 10 | 10 | 10 | 10 |
| Polyethylene, 12,000 mol. wt | | | 3 | | | | 1 | 3 | | |
| Polyethylene, 2500 mol. wt | | | | 3 | | | | | 3 | |
| Polyisobutylene, 80,000 mol. wt | | | | | | | | | | 2 |
| Oxidized Polyethylene, 2500 mol. wt.[3] | 1 | 3 | | | 1 | 3 | | | | |
| Test Properties: | | | | | | | | | | |
| Sealing Strength, g./3 in.— | | | | | | | | | | |
| at 75° F | 32 | 33 | 30 | 33 | 44 | 44 | 32 | 33 | 26 | 21 |
| at 0° F | 43 | 36 | 33 | 30 | 57 | 57 | 41 | 30 | 30 | 25 |
| Blocking Point, °F. (T652 SM-57) | 102 | 101 | 100 | 101 | 125 | 117 | 102 | 101 | 114 | 111 |
| Viscosity, SSU/210° F | | 43 | | 59 | | 47 | | 59 | | 350 |

[1] 137° F. M.P., fully-refined crystalline wax from Mid-Continent petroleum.
[2] 171° F., M.P., 13 needle penetration at 77° F., refined microcrystalline wax from Mid-Continent petroleum.
[3] "Epolene E."

Results of tests on blends 1–4 illustrate that oxidized polyethylene is no more effective than unoxidized polyethylene for improving sealing strength of a conventional, refined paraffin wax. However, when oxidized polyethylene is added to a wax blend containing about 10% microcrystalline wax as in blends 5 and 6, sealing strength is significantly improved. Contrarily addition of unoxidized polyethylene to such a wax blend as illustrated by blends 7–9, does not result in significantly increased sealing strength. Table VII also illustrates that oxidized polyethylene is at least equal and in some cases superior to unoxidized polyethylene in imparting blocking resistance to wax. Furthermore, it does not cause unduly high blend viscosity as does polyisobutylene in blend 10. If a high degree of gloss retention is desired, this can easily be obtained by using both oxidized and unoxidized polyethylene, as illustrated in the examples above.

Example VII, of course, cites results for a borderline case. Coating waxes of much higher sealing strength can be prepared by increasing the ratio of microcrystalline wax to paraffin wax, and I prefer at least about 25% of the microcrystalline wax. This is illustrated by Example VIII.

EXAMPLE VIII

A series of blends was prepared according to the method of Example VI. Compositions and results of tests on these blends are shown in Table VIII.

Table VIII

| Components, wt. percent | 11 | 12 | 13 |
|---|---|---|---|
| Paraffin Wax A | 48 | 48 | 48 |
| Microcrystalline Wax A | 48 | 48 | 48 |
| Polyethylene, 12,000 mol. wt | | 4 | |
| Polyethylene, 2500 mol. wt | | | 4 |
| Oxidized Polyethylene, 2500 mol. wt.[1] | 4 | | |
| Test Properties: | | | |
| Sealing Strength, g./3 in.— | | | |
| at 75° F | 158 | 60 | 35 |
| at 0° F | 98 | 38 | 32 |
| Blocking Point, °F. (T652 SM-57) | 115 | 115 | 115 |

[1] "Epolene E."

The results clearly illustrate the superior sealing strength exhibited by a blend of paraffin and microcrystalline waxes containing a small amount of partially oxidized polyethylene over a similar wax blend containing regular or unoxidized polyethylene.

Values for sealing strength and laminating strength reported in the above tables were determined by coating a bleached sulfite paper of 25 lbs./ream (3000 ft.²) basis weight with a surface coat of 5 lb./rm. of the composition to be tested. The reverse side of the paper was coated with 2–3 lbs./rm. A test specimen was then prepared by sealing together two sheets, face to face, by drawing the sheets over a sealing roll, 2.5 inches in diameter, and maintained at 210° F. by internal circulation of steam—the resulting seals being allowed to cool in air. The plies were drawn across the sealing roll at 25 inches per minute, traveling vertically upward against the side of the roll and passing over a sufficient sector that the angle of departure from the roll was 60° with the horizontal. The outermost ply was loaded at the trailing end with a 200 gram weight to supply a controlled sealing pressure. The plies thus sealed were trimmed to 10" x 3", aged for 24 hours at 73° F. and 50% R. H., and desealed using an Instron Tensil Tester. Seals tested at low temperatures were conditioned for at least 2 hours at test temperature prior to testing. All tests were run in triplicate. It should be noted that the test for laminating strength and sealing strength is one and the same and whether one calls it a laminating strength test or sealing strength test is a matter of terminology. Generally, however, "seal strength" is used in reference to wax compositions characterized by being hard, scuff resistant, probably glossy, etc. while "laminating strength" is used with reference to wax compositions being somewhat softer and having no requirements as to scuff, gloss and blocking point.

Values for stain temperatures were determined by coating cellophane with 60–80 lbs./ram on one side only, placing a one-inch wide strip between two strips of 60 lbs./rm. unblenched kraft and testing the resulting sandwich on a temperature gradient blocking plate under the conditions described in the TAPPI T652 SM-57 gradient blocking test. The staining temperature was taken as the lowest temperature at which the kraft strip in contact with the wax coating showed definite staining across the entire width of the interior side.

In summary, it has been found that inclusion of minor amounts of oxidized polymethylenic resin markedly increases the adhesive strength of a wide variety of petroleum wax compounds, both at ordinary and low temperatures, and without adversely affecting hardness, blocking and scuff resistance, and other desirable properties, and without creating undue viscosity increase. In addition, if a minor amount of conventional polyethylene additive is incorporated in the composition to provide gloss stability, blocking resistance, cohesive strength, toughness, scuff resistance, leveling action, decreased staining tendencies, control of penetration into the substrate, or such of these properties as may be desired, the resulting compositions exhibit markedly superior performance compared to previous compositions. By varying th characteristics of the base petroleum wax or waxes, and by using appropriate amounts of oxidized polyethylene or oxidized polyethylene and regular polyethylene, it is possible to produce superior waxes which can be used to coat cellulosic materials such as wood, paper, paperboard, fibrous or non-fibrous films.

Similarly, superior waxes can be produced for laminating two or more plies of fibrous or non-fibrous cellulosic materials such as wood, paper, cellophane and other sheet materials like metal foil.

I claim:

1. A wax composition consisting essentially of a wax component consisting essentially of about 0 to 90% by weight of petroleum paraffin wax, about 10 to 100% of a petroleum microcrystalline wax having a 100 gram needle penetration at 77° F. of at least about 10, and having about 0 to 35% by weight of a wax-compatible polyethylene resin and about 0.1 to 10% of wax-compatible carboxyl group-substituted oxidized polyethylene having at least one carboxylic group for each 15 average molecules and having a molecular weight of at least 750.

2. The composition of claim 1 wherein the oxidized polyethylene resin contains at least one carboxylic group for each 1 to 3 average molecules and the polyethylene resin and oxidized polyethylene resin each has a molecular weight of about 2000 to 25,000.

3. The composition of claim 2 wherein the amount of polyethylene resin present in about .5 to 10% by weight and the amount of oxidized polyethylene resin incorporated is about .25 to 3% by weight.

4. A wax composition consisting essentially of a wax component consisting essentially of about 40 to 70% by weight of petroleum paraffin wax and about 30 to 60% by weight of petroleum microcrystalline wax having a 100 gram needle penetration at 77° F. of about 10 to 17 and having about 0 to 35% by weight of a wax-compatible polyethylene resin and about 0.1 to 10% by weight of a wax-compatible carboxyl group-substituted oxidized polyethylene resin containing at least one carboxylic group for each 15 average molecules and having a molecular weight at least about 750.

5. A wax composition consisting essentially of a wax component consisting essentially of about 40 to 70% by weight of petroleum paraffin wax and about 30 to 60% by weight of petroleum microcrystalline wax having a 100 gram needle penetration at 77° F. of about 10 to 17 and having about 0.5 to 10% by weight of a wax-compatible polyethylene resin and about .25 to 3% by weight of a wax-compatible carboxyl group-substituted oxidized polyethylene resin containing at least one carboxylic group for each 1 to 3 average molecules, the polyethylene resin and oxidized polyethylene resin each having a molecular weight of about 2000 to 25,000.

6. A wax composition consisting essentially of a wax component consisting essentially of about 80 to 100% by weight of petroleum microcrystalline wax having a 100 gram needle penetration at 77° F. of about 17 to 30 and about 0 to 20% by weight of petroleum paraffin wax and having about 0 to 35% by weight of a wax-compatible polyethylene resin and about .1 to 10% by weight of a wax-compatible carboxyl group-substituted oxidized polyethylene resin containing at least one carboxylic group for each 15 average molecules and having a molecular weight of at least about 750.

7. A wax composition consisting essentially of a wax component consisting essentially of about 80 to 100% by weight of petroleum microcrystalline wax having a 100 gram needle penetration at 77° F. of about 17 to 30 and about 0 to 20% by weight of petroleum paraffin wax and having about .5 to 10% by weight of a wax-compatible polyethylene resin and about .25 to 3% by weight of a wax-compatible carboxyl group-substituted oxidized polyethylene resin containing at least one carboxylic group for each 1 to 3 average molecules, the polyethylene resin and oxidized polyethylene resin each having a molecular weight of 2000 to 25,000.

8. A wax composition consisting essentially of a wax component consisting essentially of about 40 to 90% by weight of petroleum paraffin wax, about 10 to 60% by weight of petroleum microcrystalline wax having a 100 gram needle penetration at 77° F. of at least about 10, and having about 0 to 35% by weight of a wax-compatible polyethylene resin and about 0.1 to 10% of a wax-compatible carboxyl group-substituted oxidized polyethylene resin having at least one carboxylic group for each 15 average molecules and having a molecular weight of at least 750.

9. The composition of claim 8 wherein the oxidized polyethylene resin contains at least one carboxylic group for each 1 to 3 average molecules and the polyethylene resin and oxidized polyethylene resin each has a molecular weight of about 2000 to 25,000.

10. The composition of claim 9 wherein the amount of polyethylene resin present is about .5 to 10% by weight and the amount of oxidized polyethylene resin incorporated is about .25 to 3% by weight.

(References on following page)

References Cited in the file of this patent

UNITED STATES PATENTS

| | | |
|---|---|---|
| 2,077,449 | Thompson | Oct. 15, 1935 |
| 2,594,547 | Fischer | Apr. 29, 1952 |
| 2,642,366 | Rumberger | June 16, 1953 |
| 2,698,309 | Thwaites et al. | Dec. 28, 1954 |
| 2,712,534 | Erchak | July 5, 1955 |
| 2,728,735 | Anderson | Dec. 27, 1955 |
| 2,733,225 | Smith | Jan. 31, 1956 |
| 2,758,100 | Bailly et al. | Aug. 7, 1956 |
| 2,791,570 | Backlund | May 7, 1957 |
| 2,808,382 | Jakatis | Oct. 1, 1957 |
| 2,828,219 | Heiges et al. | Mar. 25, 1958 |
| 2,879,238 | De Groote et al. | Mar. 24, 1959 |
| 2,879,241 | De Groote et al. | Mar. 24, 1959 |
| 2,911,384 | Thompson et al. | Nov. 3, 1959 |
| 2,928,759 | Newberg et al. | Mar. 15, 1960 |
| 2,943,069 | Rosenbaum | June 28, 1960 |

FOREIGN PATENTS

| | | |
|---|---|---|
| 581,279 | Great Britain | Oct. 7, 1946 |